UNITED STATES PATENT OFFICE.

CHARLES J. EAMES, OF NEW YORK, N. Y., ASSIGNOR TO THE CARBON IRON COMPANY, OF SAME PLACE.

PROCESS OF MANUFACTURING SPONGE AND WROUGHT IRON DIRECTLY FROM THE ORE.

SPECIFICATION forming part of Letters Patent No. 318,553, dated May 26, 1885.

Application filed December 6, 1884. (No specimens.)

*To all whom it may concern:*

Be it known that I, CHARLES J. EAMES, a citizen of the United States, residing at New York city, in the State of New York, have invented certain new and useful Improvements in Processes of Manufacturing Sponge and Wrought Iron Directly from the Ore; and I hereby declare the following to be a full, clear, and exact description of the same, such as will enable others to practice the invention.

The invention, broadly stated, may be said to consist in the deoxidation of the ore at low temperatures in a reverberatory or similar furnace having a friable highly graphitic hearth, the charge of ore being in its normal condition, (or free from added flux,) and covered by a layer of graphitic carbon, in lieu of slag or equivalent protecting covering commonly employed.

Heretofore in the manufacture of iron and steel direct from the ore the most commonly-used deoxidizing and carburizing agent employed has been charcoal, and less frequently plumbago has been employed. The most common methods of procedure have involved the mixing of the carbonaceous matter and flux with the ore and the employment of temperatures which resulted in the fusion of the metal. Where plumbago has been employed, it has been for the containing-vessel in the form of slabs, crucibles, or solid masses, and for admixture in the granular or powdered form.

The objection to the use of solid masses of plumbago as a containing-chamber is that it will not readily act on the ore, while the objection to its use in a pulverized state, (as found in commerce,) either admixed with the ore as a bed, is that it is separated from the charge of ore and carried off by the heated blasts traversing the chamber or bed of ore; or if the metal be in a state of fusion (as in carrying the process to the production of steely iron) the plumbago rises through the metal and is lost in the slag covering the same. Moreover, the cost of plumbago (some thirty or forty dollars per ton) is almost prohibitory, and the same can be said of charcoal, as used by known methods, the quantity required enhancing greatly the cost of production of the iron.

With the above review of and acknowledgement of the state of the art, I will now specifically point out wherein my invention lies and its advantages.

The graphite preferably employed by me is of a character known in commerce as "graphitic carbon," such as is found at Cranston, Rhode Island, and in other localities, is of an impure character, containing earthy matter and iron in considerable quantity, can be obtained at comparatively low prices, and is known in trade as "graphitic carbon," to distinguish it from "plumbago" of commerce.

The furnace employed may be an ordinary reverberatory or any of its many well-known equivalents. The hearth or sole of this furnace is provided with a friable highly graphitic covering, which I prefer to form as follows: Take of plumbago, or of the graphitic carbon hereinbefore referred to, pulverized, an amount equal to sixty (60) per cent. (more or less) of the whole mass. Add thereto about forty (40) per cent. of pulverized fire-brick, mix the mass intimately, and add sufficient of an adhesive carbonaceous binder—such as molasses or coal-tar—to enable the mass to be spread as a sole and lining for the furnace. This hearth, when dry, will be compact, and yet sufficiently friable to yield its carbonaceous matter gradually to the superimposed ore. The hearth may also be formed, if desired, by covering the sole with a bed of graphitic lumps from six (6) to twelve (12) inches in depth, protecting the flue-bridge and bridge-wall thereby. On such a sole or hearth the ore, preferably without flux of any character, and in the condition in which it comes from the mine, is charged to a suitable depth, say from one (1) to four (4) inches, and is then covered by a protective layer of graphitic carbon. This protective layer is composed of the graphitic carbon in lumps or small pieces substantially in the condition in which it comes from the mine.

For heating the furnace and charge any suitable solid or gaseous fuel may be used, provided always it is of a character which will admit of perfect control, so that a uniform temperature can be maintained. The charge is first subjected to a temperature not exceeding 1500° or 2000° Fahrenheit, or such a temperature as will maintain the interior of the furnace at a dull-red. This temperature is maintained until the ore is deoxidized, which will take from five (5) to seven (7) hours. It will be observed that this stage of the process is conducted at a temperature too low to fuse the metal. When this deoxidation of the ore is completed, the temperature of the furnace can be raised sufficiently to cause the agglutination of the sponge, and the mass can then be balled for removal to the blooming apparatus. The second stage, or stage of agglomeration of the sponge, will occupy from one (1) to two (2) hours, if carefully conducted, which it should be in order to avoid the fusion of the metal and the formation of a slaggy sponge, such as the majority of sponges produced by processes heretofore practiced.

It will be noted that the following advantages result from my improved method: First, there is no loss of material and uncertainty of result, as when plumbago in a pulverized state is used admixed with the ore; secondly, there is no dearth of the deoxidizing agent or retardation of the process, as occurs where solid containing vessels or soles of a non-friable character are employed; thirdly, the open character of the top covering of lump-graphite permits the circulation through the mass of the heated gases; and, fourthly, while the ore is fully protected from the direct action of the flame by the graphitic covering there is an absence of any extraneous substances which would induce the formation of slaggy sponge in case of the temperature temporarily becoming excessive in the agglomerating stage.

I do not herein claim a friable graphitic hearth or bed for the treatment of ores in the deoxidizing stage, as the same forms the subject-matter of applications, Serial No. 149,823, filed December 9, 1884, and Serial No. 144,152, filed September 27, 1884; neither do I herein claim the use of a friable graphitic bed and a graphitic lump covering for the ore without the admixture of graphitic lumps with the ore, as the same forms the subject-matter of an application filed December 6, 1884, Serial No. 149,683. Furthermore, I do not herein claim a process for the production of steely iron, wherein the graphitic lumps are intermingled with ore in its natural state, and subjected to a dull-red sustained heat until deoxidation, takes place, and then to a further sustained higher heat until the sponge is agglomerated and steelified, as the same forms the subject-matter of application, Serial No. 157,225, filed February 27, 1885. Nor do I claim charging the ore on a friable graphitic hearth, covering the charge with a layer of graphitic lumps, and subjecting the charge first to a dull-red sustained heat until deoxidation, and then to a sustained higher heat until the sponge is agglomerated and steelified, as the same forms the subject-matter of application, Serial No. 157,226, filed February 27, 1885.

Having thus fully set forth the nature and advantages of my invention, and clearly pointed out wherein it differs from all preceding processes for like purposes, what I claim, and desire to secure by Letters Patent, is—

1. The method herein described for the production of iron sponge direct from the ore in its natural state, and without admixture of flux, carbon, or graphite, which consists in charging the ore on a friable graphitic hearth, covering the charge with a layer of lump-graphite, and then subjecting the charge to a dull-red sustained heat until deoxidation is accomplished, substantially as and for the purposes specified.

2. The method herein described for the production of wrought-iron direct from the ore, which consists in charging the ore on a friable graphitic hearth, covering the charge of ore in its natural state, and without admixture of flux, carbon, or graphite, with a layer of lump-graphite, subjecting the charge to a dull-red sustained heat until deoxidation takes place, and then slightly increasing the heat for a short period to agglomerate the mass, so that the sponge can be balled and removed to the blooming apparatus, substantially as and for the purposes specified.

In testimony whereof I affix my signature, in presence of two witnesses, this 6th day of December, 1884.

CHARLES J. EAMES.

Witnesses:
F. H. RITTER, Jr.,
H. B. MOULTON.